Jan. 12, 1965   M. GERTEL   3,164,984
VIBRATION TESTING DEVICE
Filed Nov. 17, 1959   2 Sheets-Sheet 1

INVENTOR.
MAURICE GERTEL
BY Kenway, Jenney,
Witter & Hildreth
ATTORNEYS

Jan. 12, 1965    M. GERTEL    3,164,984
VIBRATION TESTING DEVICE
Filed Nov. 17, 1959    2 Sheets-Sheet 2

INVENTOR.
MAURICE GERTEL
BY *Kenway, Jenney,
Witter, & Hildreth*
ATTORNEYS

United States Patent Office 3,164,984
Patented Jan. 12, 1965

3,164,984
VIBRATION TESTING DEVICE
Maurice Gertel, Chestnut Hill, Mass., assignor, by mesne assignments, to Allied Research Associates, Inc., Boston, Mass., a corporation of Delaware
Filed Nov. 17, 1959, Ser. No. 853,522
4 Claims. (Cl. 73—71.6)

This invention relates to vibration testing devices and, more particularly, to a novel and improved device for horizontal vibration testing of articles.

A known construction of a vibration testing device for providing rectilinear vibration testing of articles in a horizontal plane comprises a base member having a horizontally extending upwardly facing smooth surface on which is slidably supported a table member which is adapted to carry an article to be tested. Guide means are usually provided on the base member to limit movement of the table in a horizontal plane in all but one rectilinear direction of movement. Unless the test unit, which comprises the movable table and article supported thereon, is driven through the center of gravity thereof, there is a tendency for angular components of vibration to be developed which tend to tilt the test unit out of the desired horizontal plane of movement. The result is of course, an adverse effect on the accuracy of the test. Inasmuch as it is difficult to provide a driving connection to the table member which will permit driving through the center of gravity of all of the various configurations of test units, it has heretofore been a common practice to reluctantly accept the inaccuracies attendant to driving the test unit through other than its center of gravity. A further problem of previous devices may occur in the testing of relatively heavy articles as a result of the attendant relatively high frictional resistance to sliding movement between the table and base members of the testing device. These relatively high frictional forces increase the power required to drive the test unit and, further, may introduce inaccuracies in the test results, particularly at low frequencies of vibration.

Accordingly, it is the primary object of this invention to provide a novel and improved vibration testing device for testing articles in horizontal planes which will provide substantially pure rectilinear vibrations even though the test unit is not driven through its center of gravity and which will provide relatively low frictional resistance to relative movement between the base and table members of the device so as to be particularly suitable for use in the testing of relatively heavy articles.

Other objects and advantages of this invention will be apparent from a consideration of the following description and accompanying drawings.

The primary object of the invention is achieved in a preferred embodiment thereof, which comprises a stationary base member having a smooth upwardly facing horizontally extending surface and a reciprocable table member overlying said base member and having a smooth downwardly facing surface slidably supported by the smooth surface of the base member. One of the table and base members is provided with a reservoir for containing an oil-like liquid, with means being provided for connecting the reservoir between the smooth surfaces of the table and base member. In this manner an oil film will be provided between the table and base members, and during reciprocation of the table member, this film will provide a cohesive action which tends to prevent separation of the table and base members. Additionally, one of the table and base members is provided with means for conducting a pressurized gaseous medium. The gaseous medium conducting means communicates at one end with the other of said members at a portion thereof which faces in the same direction as the smooth surface of the other member. The gaseous medium conducting means is connected to a source of pressurized gaseous medium by an adjustable pressure control valve, whereby the force exerted on the members by the gaseous medium may be varied. The pressure of the gaseous medium is adjusted to provide a force which is insufficient to separate the table and base members and yet which is sufficient to relieve a major portion of the weight of the table and articles supported thereon, thus substantially decreasing the frictional resistance to sliding movement between the table and base members. Further, the oil reservoir is connected to the gaseous medium conducting means to provide forced distribution of oil from within the reservoir and between the table and base members to assure an even distribution of the oil film between these members and to assure a sufficient distribution of oil during the testing of relatively heavy articles. A more detailed understanding of the invention may be had by reference to the following detailed description of a preferred embodiment thereof when taken in connection with the accompanying drawings, in which:

Figure 1:
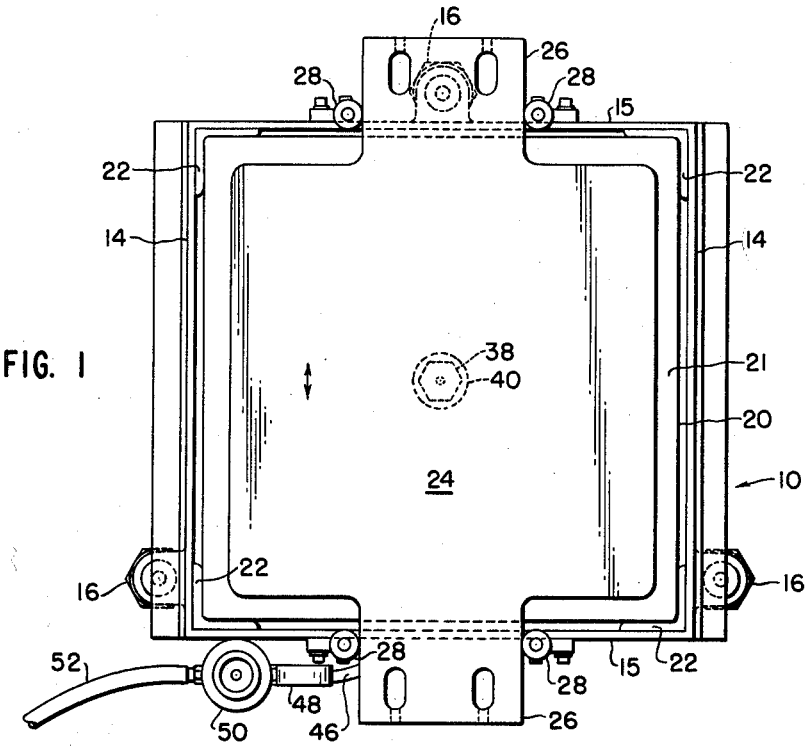
FIG. 1 is a plan view of a vibration testing device incorporating the present invention.
Figure 2:
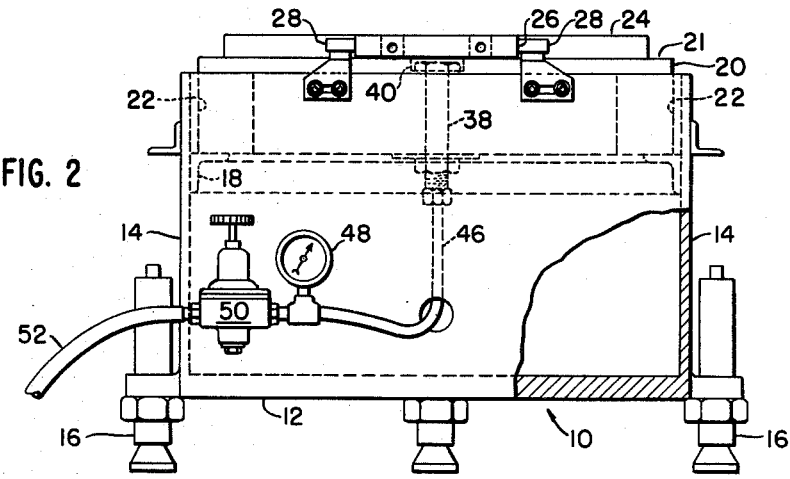
FIG. 2 is an end view, partly cut away, of the device of FIG. 1.

With reference to the drawings, and particularly FIGS. 1 and 2, a preferred embodiment of a testing device incorporating the present invention comprises supporting means or a housing 10 including a base 12, upstanding side walls 14, and upstanding end walls 15. The base is supported by three adjustable levelling feet 16 to permit accurate levelling of the device. The housing or support 10 is preferably hollow as clearly indicated in FIG. 2, whereby additional weight, such as sand bags, lead, etc., may be placed within the housing if desired. Access means (not shown) are provided for easy installation and removal of the added weight so that during testing sufficient weight may be provided while this weight may be easily removed in order to facilitate transportation of the device from one location to another.

An angle member or support 18 is provided around the inner wall of the housing 10 and provides means for supporting a base member 20, which in the specific embodiment is a rectangular block of granite. The base member is horizontally located within the support 10 by angle brackets 22 fitting around the four corners of the base member and the adjacent side end walls of the support. A table member 24 overlies and is slidably supported by the base member 20. The table 24 is adapted to be reciprocated in the direction of the arrow of FIG. 1 and and in a plane extending parallel to the top surface 21 of the base member 20. The table member is preferably fabricated of a light weight material such as magnesium and is provided with extensions 26 at its opposite ends extending in the direction of movement of the table. A pair of rollers 28 are carried on each of the end walls 15 of the housing and are engageable with the opposite sides, respectively, of the adjacent table extension 26 to guide the table in its rectilinear movement and to limit movement of the table except in the direction indicated by the arrow in FIG. 1. Means, such as apertures, are provided on the extensions 26 for connecting the table to a suitable power unit (not shown) for the reciprocation of the table. The power unit may be of any suitable type, such as a magnetic vibrator.

Figure 3:
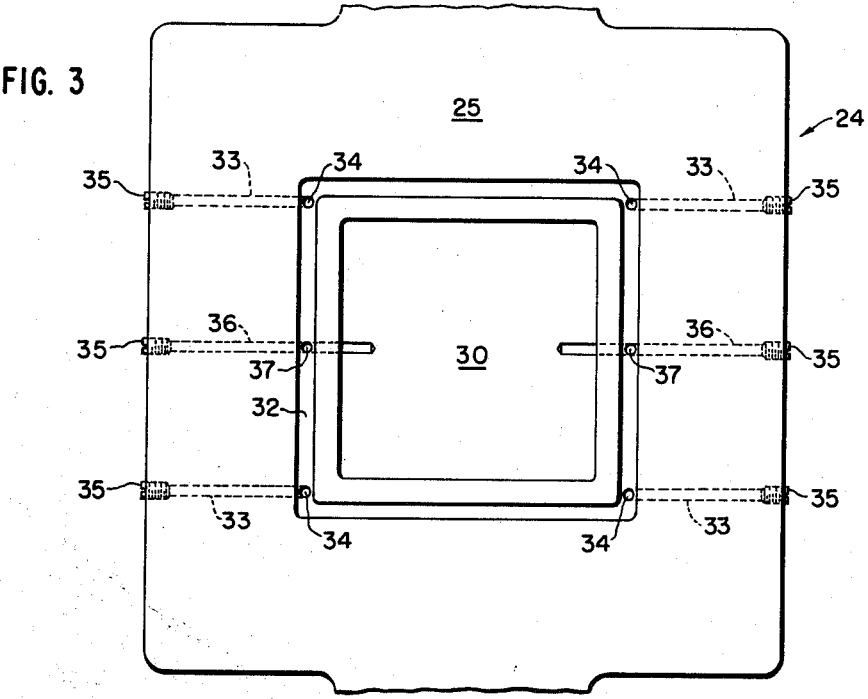
FIG. 3 is an enlarged fragmentary bottom view of the table of the device of FIG. 1.
Figure 4:
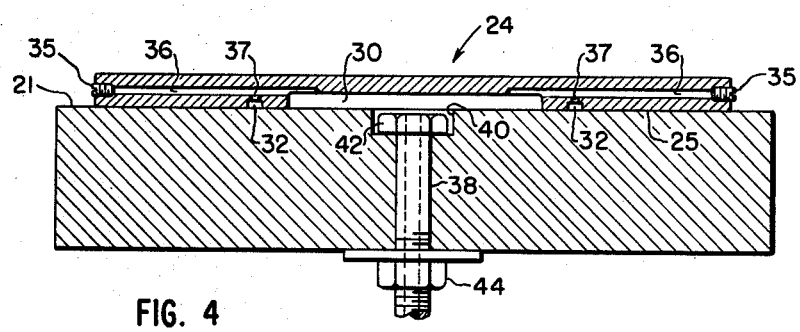
FIG. 4 is an enlarged cross sectional view of the table and base members of the device of FIG. 1.

In accordance with the invention, and with reference to FIGS. 3 and 4, the underside of the table 24 is provided with a flat smooth horizontally extending downwardly facing surface 25 which overlies the flat oppositely facing smooth surface 21 of the base 20. In accordance with the invention, a relatively large rectangular recess 30 is provided in the smooth undersurface 26 of the table 24 with the recess preferably being centered relative to the table. Further in accordance with the invention, a relatively narrow recess 32 is provided in the smooth undersurface 26 of the table, with the recess 32 extending around the recess 30 in spaced relation thereto. As will be apparent hereinafter, the recess 32 forms a reservoir for containing an oil-like fluid. A plurality of oil filler passages 33 are provided internally of the table. These passages extend from the sides of the table and terminate short of the central recess 30 in overlying relation to the recess 32. A plurality of branch passages 34 respectively connect the passages to the recess 32. The outer ends of these passages are closed by plugs 35. An additional pair of internal passages 36 are provided in the table and extend, respectively, from the opposite sides of the table and over the top of the recess 32 and open at their inner ends into the central recess 30. As in the case of the passages 33, the passages 36 are connected by branch passages 37 to the reservoir 32.

The base 20 is provided with a conduit 38 extending upwardly through the center thereof and terminating in a relatively small central recess 40 in the upwardly facing smooth surface 21 of the base. The conduit 38 is secured to the base by a nut 42 disposed in the recess 40 and a second nut 44 engaged about the portion of the conduit projecting downwardly from the base. With particular reference to FIG. 2, the lower end of the conduit 38 is connected to a conduit 46 which in turn is connected to a series connected pressure gauge 48 and adjustable pressure regulator or valve 50. The regulator 50 is connected by a conduit 52 to a source (not shown) of a pressurized gaseous medium, such as compressed air.

In the use of the device just described, the reservoir 32 is filled through the passages 33 with an oil-like liquid, such as SAE 40 lubricating oil. The passages are, of course, then closed by the plugs 35. The article to be tested is mounted by suitable means (not shown) on the top of the table 24 with the table being connected to suitable means for reciprocating the same. The pressure regulator 50 is then opened to permit the flow of pressurized gaseous medium through the conduit 38 and into the recess 30 on the underside of the table. The gaseous medium will thus exert a force on the table tending to lift or separate the table from the base. Because of the connection of the recess 30 to the reservoir 32, the pressurized gaseous medium in the recess 30 will effect forced distribution of the oil in the reservoir 32 between the smooth surfaces of the table and base. The pressure of the gaseous medium is adjusted by the regulator to be sufficient to support a substantial portion of the weight of the table and article supported thereon. However, the pressure should not be sufficient to effect separation of the table and base. Ideally, the pressure within the recess 30 should be sufficient to exert a force on the table exactly equal to the weight of the table and supported test article. However, in practice it has been found that satisfactory results can be obtained when the pressure is adjusted to the point where minute bubbles of oil appear around the edges of the table. With the pressure so adjusted, the majority of the weight of the table and test article will be supported on the gaseous bearing provided by the gaseous medium within the recess 30, while at the same time the smooth undersurface of the table will be slidably supported on the smooth upper surface of the base with a thin oil film therebetween. This thin oil film will provide a strong cohesive action tending to prevent any lifting or separation of the table from the base and will satisfactorily reduce, if not eliminate, any tendency of the table to tilt by reason of its being driven along a line of action which is spaced from the center of gravity of the test unit, which comprises the table and article supported thereby.

While the invention has been described in terms of a preferred embodiment thereof, it will, of course, be apparent to those skilled in the art that various modifications and changes could be made in the structure shown and described without departing from the spirit and scope of the invention. For example, while the oil reservoir and central recess 30 might be located in either the table or the base, it is preferred, where the base is fabricated of material such as granite, to provide the recess 30 and reservoir 32 in the underside of the table, which is fabricated of a more readily machinable material. Additionally, while it is preferred that forced distribution of the oil within the reservoir be provided in order to assure an efficient oil film, particularly in the testing of heavy articles, if desired, the forced distribution feature might be eliminated while still retaining the advantages of the combination of a gaseous and oil film bearing for the table.

Accordingly, the foregoing description and accompanying drawings are to be taken only in an illustrative sense and are not to be taken in any way as limiting the invention. Rather, the invention is to be limited only by the appended claims, which shall include within their scope all structure which logically falls within the language of these claims.

I claim:

1. A vibration testing device comprising a support, a base member carried by the support and having a horizontally extending upwardly facing smooth surface, a table member slidably supported by said base member and having a horizontally extending downwardly facing smooth surface overlying the smooth surface of the base member, guide means on said support engageable with said table member for laterally guiding the table member for rectilinear sliding movement over the base member, one of said members being provided with a recess in the smooth surface thereof registering with the smooth surface of the other of said members, said one of the members being provided with a second recess in its smooth surface and surrounding the first mentioned recess in spaced relation thereto and providing a reservoir containing an oil-like fluid, said one of the members being further provided with internal passages connecting said first mentioned recess and reservoir, and means on one of said members for conducting a pressurized gaseous medium into said recess to exert a force on said members tending to separate the same in a vertical direction including means to selectively vary the pressure of the gaseous medium in said first mentioned recess to prevent vertical separation of said members by said gaseous medium.

2. A vibration testing device comprising a base member having a flat smooth upwardly-facing horizontal surface, and a reciprocable table member overlying said base member and having a flat smooth downwardly-facing horizontal surface slidably supported by the smooth surface of the base member, said base and table surfaces defining an interface region, one of the members being provided with a reservoir containing an oil-like liquid, the reservoir being in communication with the interface region, means for applying a force tending to separate said members in a vertical direction including adjustable valve means having an inlet connectible to a source of a pressurized gaseous medium and having an outlet, conduit means on one of said members connected to the outlet of said valve means, and means connecting the conduit means and said reservoir means for forced distribution of oil-like liquid in said reservoir means between the overlying smooth surfaces of said members, said connecting means being in communication with the interface region at a point spaced from the reservoir, said oil-like liquid providing an oil-like film between said smooth surfaces having a cohesive action strongly tending to prevent vertical separaton of the said members.

3. In combination: a vibration testing device comprising a support, a base member carried by the support and having a horizontally extending upwardly facing smooth surface, a table member for the support of a test article, said table member being supported by said base member and having a horizontally extending downwardly facing smooth surface overlying the smooth surface of the base member, guide means on said support engageable with said table member for laterally guiding the table member for rectilinear sliding movement over the base member, one of said members being provided with a recess in the smooth surface thereof overlying the smooth surface of the other of said members, conduit means on one of said members for conducting a pressurized gaseous medium, the conduit means communicating with said recess, reservoir means in the one of said members having said recess, said reservoir means containing an oil-like fluid and communicating with the overlying smooth surfaces of said members to provide an oil film therebetween which cohesively strongly tends to prevent vertical separation of said members, the one of said members having said recess further having passage means connecting said recess and reservoir; a source of a pressurized gaseous medium; and means connecting said source to said conduit means including an adjustable pressure control valve to set the pressure in said recess at a predetermined value insufficient to effect separation of said members but sufficient to reduce substantially the vertical loading of said table member by the weight of a test article supported thereon.

4. In combination: a vibration testing device comprising a support, a base member carried by the support and having a horizontally extending upwardly facing smooth surface, a table for the support of a test article, said table being supported by said base member and having a horizontally extending downwardly facing smooth surface overlying the smooth surface of the base member, said base and table surface defining an interface region, guide means on said support engageable with said table for laterally guiding the table member during rectilinear sliding movement over the base member, said table being provided with first recess in the smooth surface thereof overlying the smooth surface of said base member, said table being provided with a second recess in its smooth surface surrounding the first recess in spaced relation thereto, said second recess providing a reservoir containing an oil-like fluid and communicating with the interface region, to provide an oil film therebetween which strongly and cohesively tends to prevent vertical separation of the table and base member, said table being further provided with an internal passage connecting said first recess and reservoir, said base member being provided with a conduit communicating at one end with said first recess and adapted to be connected at its other end to a source of a pressurized gaseous medium; a source of a pressurized gaseous medium and means connecting said source to the other end of said conduit including an adjustable pressure control valve to set the pressure of the gaseous medium in said reservoir at a value insufficient to cause vertical separation of said table and base member but sufficient to reduce the vertical loading of the table by a test article supported thereon.

References Cited in the file of this patent

UNITED STATES PATENTS

| Re. 24,816 | Woods | Apr. 26, 1960 |
| 1,883,277 | Zerk | Oct. 18, 1932 |
| 2,521,030 | Wilson | Sept. 5, 1950 |

OTHER REFERENCES

MB Vibration Notebook, vol. 5, No. 1, February 1959. Published by MB Manuf. Co., New Haven 8, Conn.